US010649443B1

(12) United States Patent
Feldman et al.

(10) Patent No.: US 10,649,443 B1
(45) Date of Patent: *May 12, 2020

(54) EQUIPMENT CONTROL BY SERVICE REQUEST

(71) Applicant: Amazon Technologies, Inc., Seattle, WA (US)

(72) Inventors: Michael Feldman, Seattle, WA (US); Lambertus Antonius Jacobus Cornelis Schouwenaars, Henley-on-Thames (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/139,836

(22) Filed: Sep. 24, 2018

Related U.S. Application Data

(63) Continuation of application No. 14/837,911, filed on Aug. 27, 2015, now Pat. No. 10,101,732.

(51) Int. Cl.
| | | |
|---|---|---|
| *G06F 8/65* | (2018.01) | |
| *G05B 19/41* | (2006.01) | |
| *G05B 19/418* | (2006.01) | |

(52) U.S. Cl.
CPC .......... *G05B 19/4185* (2013.01); *G06F 8/65* (2013.01); *G05B 2219/31156* (2013.01)

(58) Field of Classification Search
CPC .............. H04L 63/0876; H04L 63/102; G06F 11/0709; G06F 11/0748; G06F 11/2294
USPC ......................................................... 700/19
See application file for complete search history.

(56) References Cited

U.S. PATENT DOCUMENTS

| | | |
|---|---|---|
| 6,405,157 B1 | 6/2002 | Fujii et al. |
| 8,880,639 B2 | 11/2014 | Koskelainen et al. |
| 9,555,906 B1 | 1/2017 | Worsley et al. |
| 10,101,732 B1 * | 10/2018 | Feldman ............ G05B 19/4185 |

(Continued)

OTHER PUBLICATIONS

U.S. Appl. No. 14/837,911, filed Aug. 27, 2015, Non-Final Office Action dated Nov. 15, 2017.

(Continued)

*Primary Examiner* — Michael J Brown
(74) *Attorney, Agent, or Firm* — Thomas | Horstemeyer, LLP

(57) ABSTRACT

An approach for interfacing a management control system with geographically dispersed electromechanical systems is described. Service messages are used to access services supported by a number of different types of electromechanical systems. The services of the systems are exposed through the service messages, and the systems are treated as service providers without the need to account for the different types, makes, models, and vendors of the systems when accessing them. Thus, similar to the way that a client device requests services from a server in a networked computing environment, the management control system can interact with the electromechanical systems to request services. The protocol of the service messages does not need to be changed as electromechanical systems are added, replaced, or updated, and new services and support for additional hardware can be added and updated as needed without changing the management control system.

20 Claims, 4 Drawing Sheets

(56) References Cited

U.S. PATENT DOCUMENTS

2004/0158618 A1   8/2004 Shaw

OTHER PUBLICATIONS

U.S. Appl. No. 14/837,911, filed Aug. 27, 2015, Response to Non-Final Office Action dated Nov. 15, 2017 filed Feb. 13, 2018.
U.S. Appl. No. 14/837,911, filed Aug. 27, 2015, Notice of Allowance dated Jun. 15, 2018.

* cited by examiner

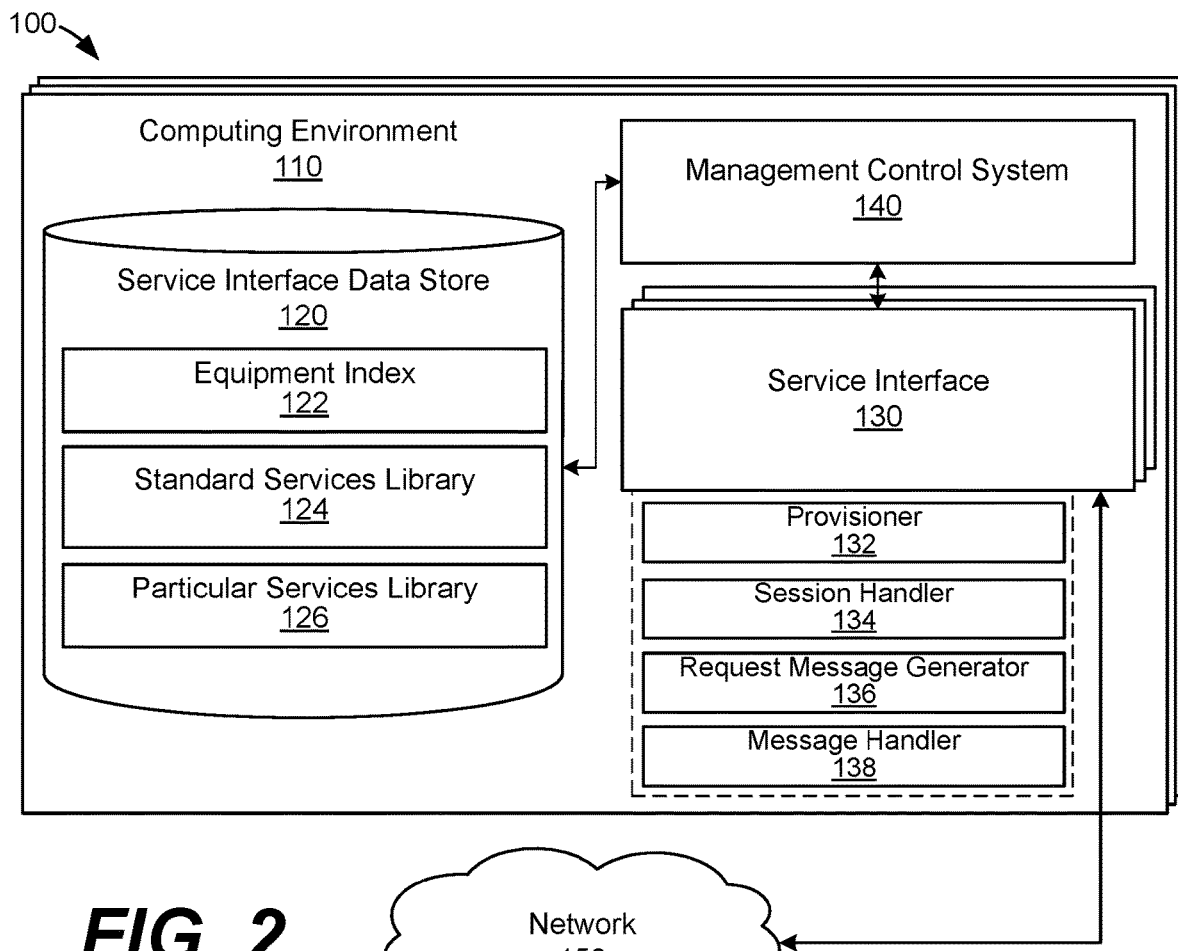
FIG. 2
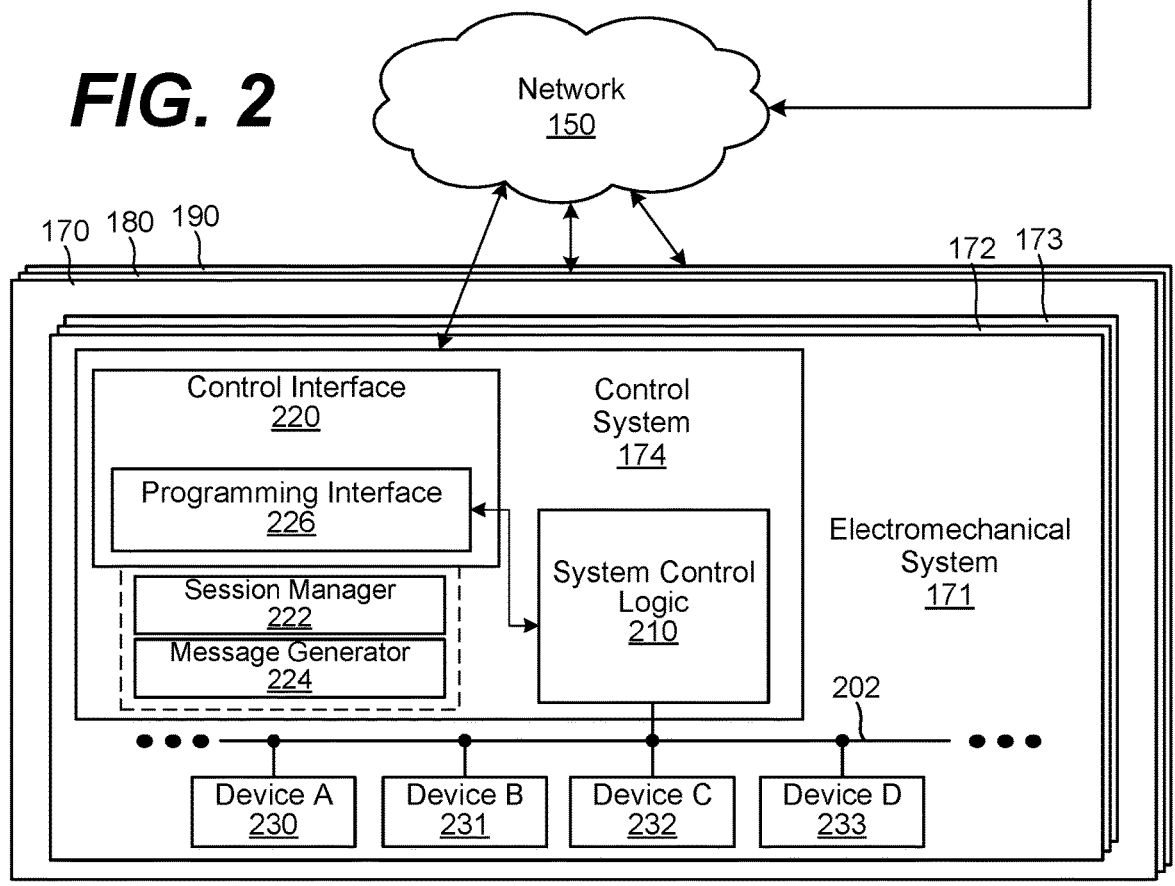

EQUIPMENT CONTROL BY SERVICE REQUEST

CROSS-REFERENCE TO RELATED APPLICATIONS

This application is a continuation of U.S. patent application Ser. No. 14/837,911, entitled "EQUIPMENT CONTROL BY SERVICE REQUEST," filed Aug. 27, 2015, the entire disclosure of which is hereby fully incorporated herein by reference.

BACKGROUND

In materials handling facilities, for example, various electromechanical systems may be relied upon to help automate certain tasks, such as picking and placing items, sorting and packaging items, and labeling boxes for shipment, among other tasks. Even at a single facility, different types, models, and configurations of electromechanical systems may be relied upon to handle similar types of tasks. These electromechanical systems may be controlled by different types of control systems. Being designed differently, it may be necessary to use separate communications and command protocols, for example, to interface with the control systems of different electromechanical systems even to perform the same or similar tasks. Further, each time an electromechanical system is replaced or added in one or more facilities, it may be necessary to design new and/or updated software layers and interfaces to control it.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 illustrates a more detailed view of the networked environment for equipment control by service request shown in FIG. 1 according to various embodiments of the present disclosure.

DETAILED DESCRIPTION

Figure 1:
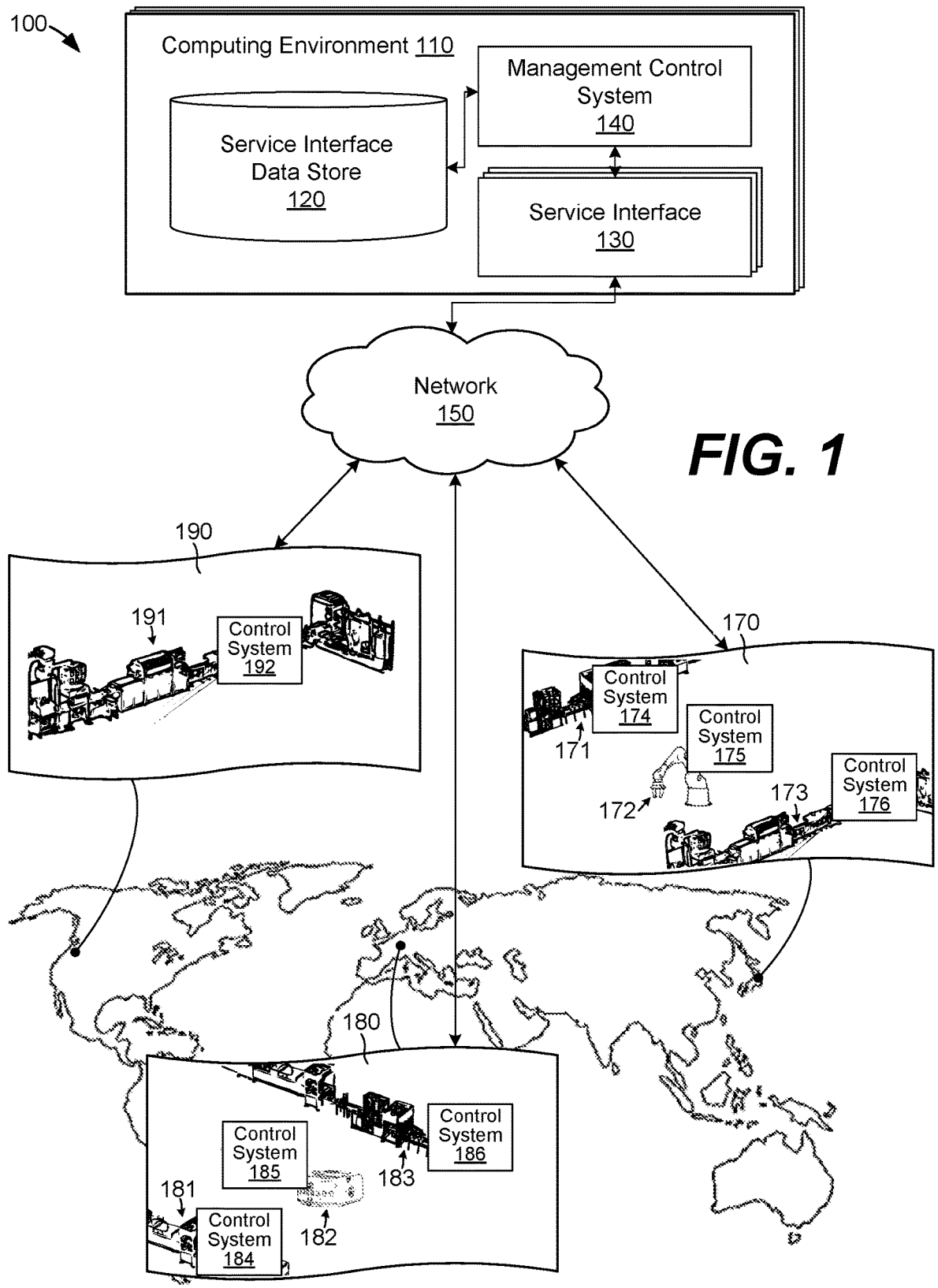
FIG. 1 illustrates a networked environment for equipment control by service request according to various embodiments of the present disclosure.

Electromechanical systems may be controlled by different types of control systems. Being designed differently, it may be necessary to use separate communications and command protocols, for example, to interface with the control systems of different electromechanical systems. Thus, maintaining separate communications and command protocols for various electromechanical systems, including those at different geographical locations, can be relatively time consuming and costly as those systems are replaced and updated over time.

In that context, the embodiments described herein are directed to an event-driven service-oriented-architecture (SOA) approach for interfacing a management control system with geographically dispersed electromechanical systems over a network. The architecture defines a service interface having a core service messaging protocol, a library of standard services supported by all (or nearly all) electromechanical systems, and a library of particular services supported by certain electromechanical systems. While the core service messaging protocol does not need to be changed over time as electromechanical systems are added, replaced, or updated, new services and support for additional hardware can be added and updated as needed.

As an example, pick-by-light and put-to-light systems are used in materials handling facilities to guide the activities of individuals and minimize time and errors when picking and placing items. These systems use indication lights to direct individuals to pick and put locations and provide push buttons to confirm the completion of pick and put operations. For each system, the operations of the indication lights and push buttons are controlled and monitored by a respective controller, such as a programmable logic controller (PLC) or other suitable control system. To coordinate the operation of multiple pick-by-light and put-to-light systems from different vendors, it was generally necessary to design a custom software "driver" for each of the systems. The drivers are then incorporated into the software stack, for example, of a management control system to interface with the systems. When new systems were deployed or existing systems replaced or updated, new drivers and updates to the software stack were often needed.

Using the event-driven SOA service interface described herein, certain application-specific pick-by-light and put-to-light services are defined in a core hardware-as-a-service protocol. In that way, the services performed by pick-by-light or put-to-light systems, among others, can be accessed by or exposed to the management control system using a single library of supported service messages, regardless of the manufacturer and/or PLC vendor of the systems. Thus, the management control system can address any pick-by-light or put-to-light system using the same, consistent set of messages to invoke a set of supported pick-by-light or put-to-light services.

For example, a "display cue" service request message can be generated by a management control system and communicated to a put-to-light system over a network. The message includes certain instructions, such as a service identifier, that directs the put-to-light system to provide an indication (e.g., light display) for the placement of an item by an individual. How the specific put-to-light system implements this service request message or command can be vendor-specific. In other words, two put-to-light systems may implement this service request using different control hardware, different control logic, and different types of light indicators.

In turn, when the service request is completed at the put-to-light system (e.g., when a confirmation of item placement is identified), the generation of an "operation confirmed" service reply (or event) message is triggered by the control hardware of the put-to-light system. This service reply message is communicated back to the management control system to indicate that the requested service or operation was completed. In addition to services that are particular to pick-by-light and put-to-light systems, the management control system can address those systems (and others) using a consistent set of standard service messages to perform standard services.

Turning to the figures for additional examples of the embodiments, FIG. 1 illustrates a networked environment 100 for equipment control by service request according to various embodiments of the present disclosure. The networked environment 100 includes a computing environment 110, a network 150, and geographically dispersed facilities 170, 180, and 190. The computing environment 110 includes a service interface data store 120, a service interface 130, and a management control system 140. In various embodiments, the facilities 170, 180, and 190 may be representative of materials handling, sorting, shipping, packing, distribution, or other shipping, handling, or packing centers or facilities, without limitation. The facility 170 includes electromechanical systems 171-173 which are directed or controlled by control systems 174-176, respectively. The facility 180 includes electromechanical systems 181-183 which are directed or controlled by control systems 184-186, respectively. Finally, the facility 190 includes an electromechanical system 191, which is directed or controlled by a control system 192.

In the networked environment 100, the electromechanical systems 171-173, 181-183, and 191 are communicatively coupled to the computing environment 110 over the network 150. The computing environment 110 may be located at any suitable geographic location (or distributed at multiple locations) and need not be located proximate to any of the facilities 170, 180, or 190. The electromechanical systems 171-173, 181-183, and 191 are representative of various types of systems that may be relied upon at materials handling or other facilities.

It should be appreciated that the networked environment 100 is representative and provided by way of example. Other embodiments may include additional or fewer facilities (i.e., similar to the facilities 170, 180, and 190). Further, the number of electromechanical systems and associated control systems may vary among embodiments as compared to those shown in FIG. 1.

In the computing environment 110, the management control system 140 is configured to oversee the operation of materials handling, for example, at one or more of the facilities 170, 180, or 190. In that sense, the management control system 140 may be embodied as a set of core business principles, logic, and/or services that direct the operations at facilities in various geographic locations in a coordinated manner. To direct the operations at the facilities 170, 180, or 190, the management control system 140 sends and receives service messages to and from the electromechanical systems 171-173, 181-183, and 191 as described herein.

The electromechanical systems 171-173, 181-183, and 191 may be embodied as a variety of different types of systems designed to accomplish different tasks, and the control systems 174-176, 184-186, and 192 may be embodied as controllers from multiple vendors that operate according to different, vendor-specific software and/or hardware logic. For example, different PLC vendors may each use proprietary communication and data addressing protocols and different real-time operating systems. While several protocols may be supported by various controllers, none may support coverage for all systems and devices. Thus, without using the embodiments described herein, it may be necessary to design custom software interfaces, drivers, and/or protocols between the management control system 140 and one or more of the control systems 174-176, 184-186, and 192. These proprietary interfaces carry drawbacks, such as hampering the development of a common set of protocols and instructions among systems, even for electromechanical systems that perform the same or similar tasks, the need to modify vendor software in the systems (which may void warranties or service agreements), and the lack of modularity, consistency, and reusability, among others.

According to aspects of the embodiments, to facilitate control of the electromechanical systems 171-173, 181-183, and 191 by the management control system 140, the service interface 130 provides a standardized interface to the services supported by the electromechanical systems 171-173, 181-183, and 191. The service interface 130 may be representative of multiple service interfaces, each being associated with a particular one (or a service requested from one) of the electromechanical systems 171-173, 181-183, and 191. The service interface 130 implements a message-oriented, event-driven protocol to exchange messages between the management control system 140 and the respective control systems 174-176, 184-186, and 192 of the electromechanical systems 171-173, 181-183, and 191.

The service interface 130 is based on a core service messaging protocol, a library of standard services supported by all (or nearly all) the systems, and a library of particular services supported by certain ones of the systems. In that context, the service interface data store 120 stores data and data structures for reference to and access by the management control system 140, such as equipment or system information, a standard services library, and a particular services library. While the core service messaging protocol of the service interface 130 does not need to be changed over time as electromechanical systems are added, replaced, or updated at the facilities 170, 180, and 190, new services and support for additional hardware can be added as needed.

Through the service interface 130, which may be representative of multiple service interfaces, the electromechanical systems 171-173, 181-183, and 191 appear to the management control system 140 as one or more hardware services, including standard and particular or application-specific services. In other words, from the standpoint of the management control system 140, the operations, configurations, statuses, etc. of the electromechanical systems 171-173, 181-183, and 191 are exposed as services through the service interface 130. The service interface 130 provides an abstraction layer between the management control system 140 and the electromechanical systems 171-173, 181-183, and 191. Thus, it is easier to update, change, and/or modify the electromechanical systems in the facilities 170, 180, and 190 without making significant changes to the logic or operations of the management control system 140. Further, using the service interface 130, the control-system-specific hardware and/or software dependencies found in various electromechanical systems can be masked behind a set of service definitions.

As described in further detail below with reference to FIG. 2, the control systems 174-176, 184-186, and 192 may each include a control interface associated with the service interface 130. Those control interfaces can receive service messages transported over the network 150 from the service interface 130. In turn, the control interfaces can parse the service messages and, through applications interfaces, instruct the vendor-supplied control logic of the electromechanical systems 171-173, 181-183, and 191 to perform services according to the messages. Additionally, the control interfaces can generate service reply and event messages based on ongoing operations and conditions at the electromechanical systems 171-173, 181-183, and 191, and forward those messages to the service interface 130 over the network 150.

Turning to FIG. 2, a more detailed view of the networked environment 100 in FIG. 1 is illustrated. In addition to what is shown in FIG. 1, FIG. 2 further illustrates an equipment index 122, a standard services library 124, and a particular services library 126 of the service interface data store 120. FIG. 2 also illustrates a provisioner 132, a session handler 134, a request message generator 136, and a message handler 138 associated with the service interface 130. The operations of the individual components of the computing environment 110 are described in further detail below.

The computing environment 110 may be embodied as one or more computers, computing devices, or computing systems. In certain embodiments, the computing environment 110 may include one or more computing devices arranged, for example, in one or more server or computer banks. The computing device or devices may be located at a single installation site or distributed among different geographical locations. As further described below in connection with FIG. 4, the computing environment 110 may include a plurality of computing devices that together embody a hosted computing resource, a grid computing resource, and/or other distributed computing arrangement. In some cases, the computing environment 110 may be embodied as an elastic computing resource where an allotted capacity of processing, network, storage, or other computing-related resources varies over time. The computing environment 110 may also be embodied, in part, as various functional and/or logic (e.g., computer-readable instruction, device, circuit, processing circuit, etc.) elements configured to direct the computing environment 110 to perform aspects of the embodiments described herein.

The network 150 may include the Internet, intranets, extranets, wide area networks (WANs), local area networks (LANs), wired networks, wireless networks, cable networks, satellite networks, other suitable networks, or any combinations thereof. It is noted that the computing environment 110 may communicate with the electromechanical systems 171-173, 181-183, and 191 in the facilities 170, 180, and 190 using various systems interconnect models and/or protocols such as simple object access protocol (SOAP), representational state transfer (REST), real-time transport protocol (RTP), user datagram protocol (UDP), internet protocol (IP), transmission control protocol (TCP), and/or other protocols for communicating data over the network 150, without limitation. It is noted here that, although not illustrated, the network 150 may include connections to any number of client devices or network hosts, such as website servers, file servers, networked computing resources, databases, data stores, or any other network devices or computing systems.

Similar to the other electromechanical systems 172, 173, 181-183, and 191 shown in FIG. 1, the electromechanical system 171 is representative of any type of electromechanical system relied upon to help automate one or more tasks. For example, the electromechanical system 171 may be embodied as a pick (e.g., pick-by-light, etc.), put (e.g., put-to-light, etc.), sort, package, and/or label application system, manufacturing or tooling system, robotic assembly system, robotic pick, place, or transfer system, imaging (e.g., camera) system, or other automated system.

The electromechanical system 171 includes the control system 174, a field bus 202, and the devices A-D 230-233. Further, the control system 174 includes system control logic 210 and a control interface 220, and the control interface 220 includes a session manager 222, a message generator 224, and a programming interface 226. Further, the other electromechanical systems 172, 173, 181-183, and 191 shown in FIG. 1 may include control systems, control interfaces, control logic, and devices similar to the control system 174, the control interface 220, the system control logic 210, and the devices A-D 230-233.

In the example embodiment shown in FIG. 2, the control system 174 includes multiple analog and/or digital input and output (I/O) ports or connections along the field bus 202. In that context, the field bus 202 may be embodied as any suitable local communications interface for communications and control between the control system 174 and the devices A-D 230-233. Through the field bus 202, the system control logic 210 of the control system 174 can control and coordinate the operation of the electromechanical system 171 through coordinated control of the devices A-D 230-233, among others.

The devices A-D 230-233 may be embodied as various electrical, mechanical, or electromechanical devices, sensors, actuators, etc. that control and automate the operations and services of the electromechanical system 171. Examples of the devices A-D 230-233 may include drive motors, electromechanical actuators (e.g., solenoids, switches, relays, robotic actuators, linear actuators, etc.), cameras and vision systems, lasers, lights, light curtains, scanners, sensors, timers, buttons, switches, scales, label applicators, measurement devices (e.g., temperature sensors, humidity sensors, etc.), and other devices.

The control system 174 (and the control systems 175, 176, 184-186, and 192) may be embodied as analog, digital, or mixed analog and digital processing circuitry, including memory, configured to control the operation of the electromechanical system 171. The control system 174 is an example of an embedded real-time system, such as a PLC, that produces time-sensitive control signals for and receives feedback signals from the devices A-D 230-233 during operation. In that sense, the control system logic 210 may be embodied as a collection of vendor-specific logic, software, and/or hardware that directs the electromechanical system 171 to perform various services. The control system logic 210 may include, at least in part, computer instructions that, when executed by the processing circuitry of the control system 174, direct the control system 174 to perform various services. Similarly, the control interface 220 may be embodied as software and/or hardware that receive, parse, and generate service messages and interface with the system control logic 210, as described in further detail below. In that sense, the control interface 220 provides an abstraction layer between the computing environment 110 and the system control logic 210 of the electromechanical system 171. The control interface 220 may include, at least in part, computer instructions that, when executed by the processing circuitry of the control system 174, direct the electromechanical system 171 to perform the service messaging operations described herein.

In the electromechanical system 171, the control interface 220 may be embodied as a message-oriented event-driven interface that communicates with the service interface 130 (or a corresponding interface among a plurality of the service interfaces 130). That is, in the networked environment 100, both the service interface 130 and the control interface 220 are configured to generate, handle, and forward messages to each other. The messages are generally used by the management control system 140 to access services supported by the electromechanical system 171 and used by the system control logic 210 to provide feedback to the management control system 140. In that context, the service interface 130, the control interface 220, and examples of service messages communicated between them are described next.

Turning first to the service interface 130, it may be representative of multiple service interfaces, each being associated with a particular service defined in the standard services library 124 and/or in the particular services library 126. The service interface 130 is associated with and supported by the provisioner 132, the session handler 134, the request message generator 136, and the message handler 138. As described in further detail below, the services supported by the electromechanical system 171 may be accessed by the management control system 140 by way of an applications programming interface (API) or other suitable interface of the service interface 130.

The provisioner 132 is configured to provision one or more service sessions (e.g., network socket connections, etc.) with the electromechanical system 171 over the network 150. In that way, the provisioner 132 supports the creation of new service interfaces 130, as needed. For example, the provisioner 132 can establish a communications link with the session manager 222 of the control interface 220 based on one or more available internet protocol addresses and/or port numbers. In various embodiments, the provisioner 132 and the session manager 222 can establish any number of service sessions, as needed, depending upon the number of the service interfaces 130, for example. The provisioner 132 can assign a unique session identifier to each new communications link or session established between the service interface 130 and the control interface 220.

In one embodiment, the provisioner 132 is also configured to assign a unique addressing identifier to the electromechanical system 171 and store that identifier in the equipment index 122 for later reference. The unique addressing identifier can be updated over time, as necessary, and include any suitable type or combination of identifying information, such as a media access control (MAC) identifier, a network port and/or protocol address, manufacturing revision, make, model, and/or date information, a unique hardware identifier, or any other information associated with the control system 174 and/or the electromechanical system 171. Once a communications link is established between the service interface 130 and the control interface 220, either can initiate the transfer of messages to the other.

The session handler 134, which may be one of the services defined in the standard services library 124, is configured to verify certain operating aspects of the control interface 220, the system control logic 210, and/or the electromechanical system 171. For example, the session handler 134 can verify a functionality profile of the system control logic 210 and/or the electromechanical system 171 to determine what services are supported by the electromechanical system 171. The session handler 134 can also verify the service interface version (e.g., software, firmware, hardware, or combination thereof) of the control interface 220 and the version of the system control logic 210 (e.g., software, firmware, hardware, or combination thereof), among other parameters. The session handler 134 is also configured to store information about the electromechanical system 171 in the equipment index 122 for reference.

The request message generator 136 is configured to generate service messages over time, as directed by the management control system 140, to control the operations of the electromechanical system 171. According to the embodiments, the service messages can be used to access services supported by the electromechanical system 171 (and the electromechanical systems 172, 173, 181-183, and 191). The request message generator 136 can generate service messages in any suitable syntax or format and using any suitable type or types of data and/or data fields, such as boolean, byte, integer, float, string, arrays, and combinations thereof, among others. The messages can be generated in any suitable framing or format and in any length. In one embodiment, the messages include nulls and/or other American Standard Code for information Interchange (ASCII) control characters to frame the header and payload portions and simplify message parsing at the control interface 220.

The request message generator 136 can generate the service messages in any format suitable for transport over the network 150, taking into account the desired protocol used for transport. In one embodiment, the messages are generated for TCP transport over the network 150, although other protocols can be used depending upon design considerations such as network bandwidth overhead, latency, and data integrity, among others. Also, depending upon the design needs and capabilities of the computing environment 110 and the control system 174, messages may be layered within or encapsulated by a suitable transport security layer, to achieve a measure of security in service request communications. In that context, the computing environment 110 can include a suitable physical layer network interface device to communicate the messages to the control system 174 over the network 150. Similarly, the control system 174 can include a suitable physical layer network interface device to communicate messages.

In one embodiment, a service message can include any combination of one or more of the following fields, among others: session identifier, service identifier, function identifier, message type identifier, timestamp, length, and data payload fields. As for the structure and possible values for the fields in the messages, the request message generator 136 can reference the standard services library 124 and/or the particular services library 126.

As for the message type identifier field, a number of different types of messages can be supported among the embodiments, such as request, reply, and event messages, for example. Request type messages are generated by the request message generator 136 and transported to the control interface 220, and reply messages are generated by the message generator 224 and transported to the service interface 130. Reply messages are generated in response to some action taken at the electromechanical system 171 according to a service requested in a service request message. Additionally, event messages are generated by the message generator 224 and transported to the service interface 130 in response to some event that occurs at the electromechanical system 171, but not necessarily in connection with a requested service. Thus, as noted herein, the service interface 130 and control interface 220 provide a message-oriented, event-driven service interface to exchange messages between the management control system 140 and the respective control systems 174-176, 184-186, and 192 of the electromechanical systems 171-173, 181-183, and 191.

As for the service identifier field, a service message may generally fall into certain categories, such as standard service requests and particular service requests, for example, depending upon what type of service is being requested in the service identifier field.

Standard service request messages include requests for services supported by most (if not all) of the electromechanical systems 171-173, 181-183, and 191, regardless of the type, make, or model of the systems. Examples of standard service request messages include power on/off, session, state, alarm, performance, and configuration management service messages, among others. The service identifier field of a message can be used to distinguish which standard service is being requested in the message. For example, a session service request can be identified in a message by a service identifier (ID) of "1", a "state" service request can be identified by a service ID of "2", an "alarm" service request can be identified by a service ID of "3", etc.

Among the example standard services described above, the power on/off service is supported so that the management control system 140 can power the electromechanical system 171 on and off, by remote service message. Similarly, the session service is supported to provision a new communications link between the service interface 130 and the control interface 220 of the electromechanical system 171.

The state service is supported to expose state information related to current operating mode and/or operating state of the electromechanical system 171. For example, in reply to a state service request message, the control interface 220 may interface with the system control logic 210 to generate a state service reply message. The state service reply message may include a mode and/or state field having an ID value that identifies one of the following modes of the electromechanical system 171, among others: auto mode, manual mode, or maintenance mode. Further, the reply message may include a mode and/or state field having an ID value that identifies one of the following state conditions, among others: stopping, stopped, aborting, aborted, resetting, idle, starting, executing, suspending, suspended, unsuspending, holding, held, unholding, clearing, completing, and complete. The alarm service is supported to expose any alarms of the electromechanical system 171 to the management controller 140.

The performance service is supported to expose a standard set of definitions that can be used to read or calculate parameters of availability, performance, quality, and/or effectiveness for the electromechanical system 171. For example, the availability parameter may be defined in part by an amount of time the electromechanical system 171 was performing services over a period of time during which services could have been performed. The performance parameter may be defined by comparing the theoretical output of the electromechanical system 171, for example, to what output it actually provided over a period of time. The quality parameter may be defined by comparing the number of units produced by the electromechanical system 171, for example, to the number that met a specification of quality over a period of time. The effectiveness parameter may assume a maximum capacity for services or output with the actual number of services or outputs completed. To the extent that the system control logic 210 maintains and/or stores data values representative of these or similar performance parameters (or from which they can be calculated), the control interface 220 is configured to reply with those values in response to a performance service request message from the service interface 130.

The configuration management service is supported to permit the configuration of data (e.g., operating register values, stored operating parameters, etc.) in the electromechanical system 171. One or more parameters in a configuration service message may specify to the control interface 220 that one or more configuration values or data entries in the electromechanical system 171 are to be accessed, downloaded, uploaded, or updated, for example, with the data payload of the message being available for the transfer of the values. Similarly, an information service may be supported to request a stream of data from the electromechanical system 171 to the management control system 140 over time and during operations.

As compared to standard service request messages, particular service request messages include requests for services supported only by particular systems. Thus, a print service request message might be supported by a shipping label printing and application system, but not a pick-by-light system. Examples of particular service request messages include divert, pick, put, sort, print, scan, or label application service messages, among others.

Similar to the standard services, a particular service may be identified in a service message based on a unique ID. Further, functions of particular services can be specified in the function identifier field in a service message. For example, the sort service may include scan notification, divert notification, set destination, and destination status functions, each specified by a unique function identifier field value. Further, a label application service may include scan notification, weigh notification, reject package, print label, reject notification, and label validation functions, each specified by a unique function identifier field value. Thus, a particular service request may specify both a unique service as well as unique fields or values as part of the service. One or more messages can be generated and transported from the service interface 130 to the control interface 220 to control one or more particular service operations, for example, as directed by the management control system 140.

The message handler 138 is configured to receive service messages, such as reply and event messages, from the control interface 220. The message handler 138 is further configured to parse the service messages and, based on the content of the messages, forward them (or data in them) to the management control system 140 or other control systems for further processing and evaluation.

Turning to the control interface 220, it includes the programming interface 226 and is supported by the session manager 222 and the message generator 224. It is noted that, in the control system 174, the control interface 220 is separate from the system control logic 210. In other words, changes to the control interface 220 can be made without the need to access or modify the system control logic 210. Thus, to access the services supported by the electromechanical system 171, it is enough for the vendor of the electromechanical system 171 to interface the system control logic 210 with the programming interface 226 of the control interface 220. In that context, the programming interface 226 provides an API or other suitable interface between the control interface 220 and the system control logic 210. Through the programming interface 226, a clear line of demarcation can be maintained between the control system 220 and the vendor-specific software and/or hardware of the system control logic 210.

The session manager 222 is configured to respond to provision and session service request messages from the service interface 130 and provision one or more service sessions (e.g., network socket connections, etc.) with the service interface 130 using the control interface 220. As noted above, the provisioner 132 and the session manager 222 can establish any number of service sessions or interfaces.

The message generator 224 is configured to generate service messages over time based on the operating status of the electromechanical system 171. After being generated, the service messages are transported from the control interface 220 to the service interface 130 over the network 150. The service messages can be generated in any suitable syntax or format and using any suitable type or types of data and/or data fields. In that context, the control interface 220 can also store a library that defines supported services and suitable syntaxes and fields of messages, similar to the service interface data store 120.

As noted above, in one embodiment, the message generator 224 generates reply and event messages. The reply messages are generated in response to some action taken at the electromechanical system 171 according to a service request from the service interface 130. Additionally, the event messages are generated by the message generator 224 and transported to the service interface 130 in response to some event that occurs at the electromechanical system 171, but not necessarily in connection with a requested service.

Figure 3:
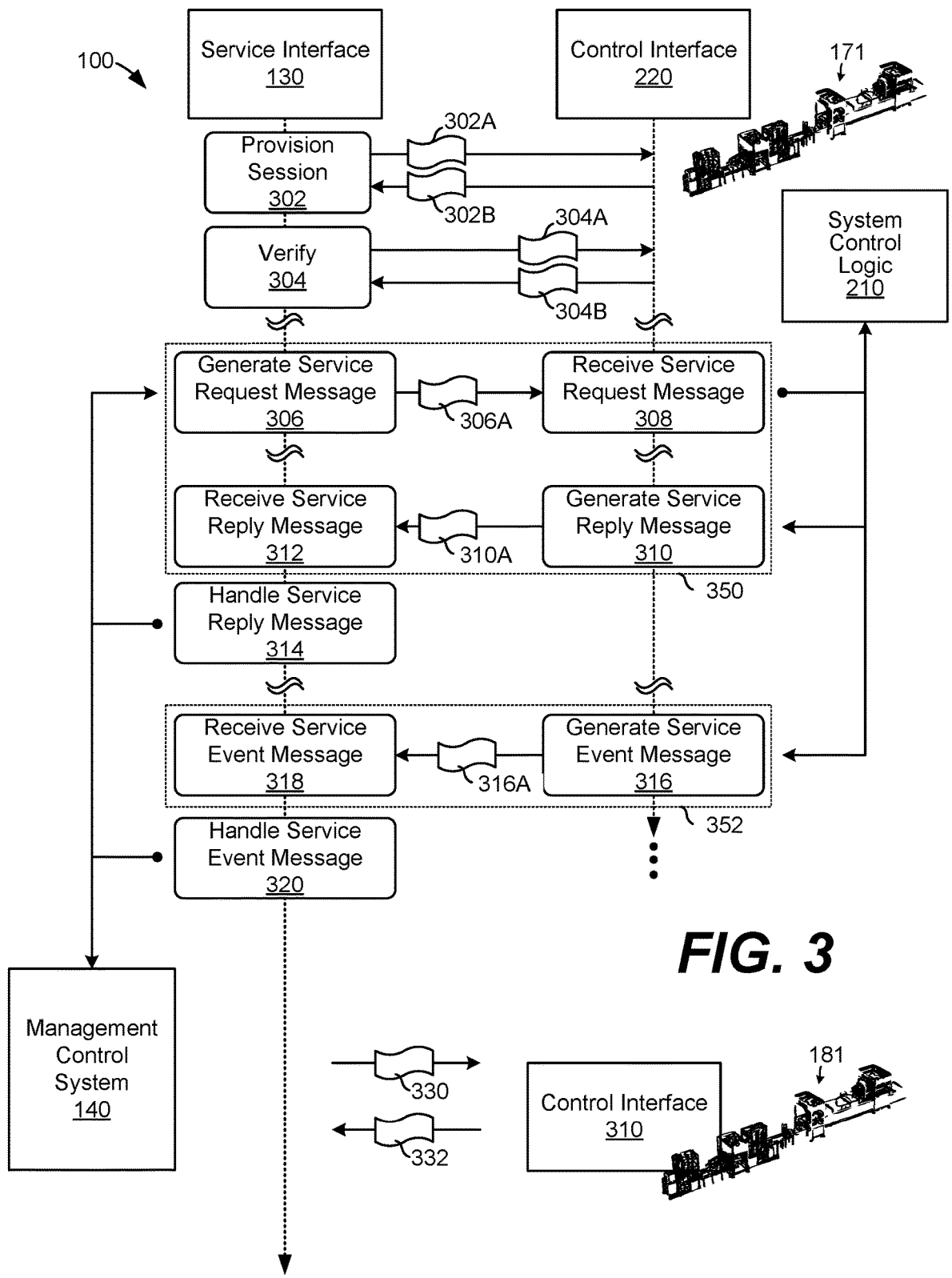
FIG. 3 illustrates a process of controlling equipment by service requests performed in the networked environment shown in FIG. 1 according to various embodiments of the present disclosure.

Turning to FIG. 3, a process of controlling equipment by service requests is illustrated. The process can be performed in the networked environment 100 in FIG. 1 according to various embodiments of the present disclosure. In certain aspects, the flowchart shown in FIG. 3 may be viewed as depicting an example group of steps performed in the networked environment 100 according to one or more embodiments. It should be appreciated that the flowchart shown in FIG. 3 provides merely one example of a functional sequence or arrangement that may be employed to implement the operations of the networked environment 100 described herein. It is noted here that, although the process is described in connection with the computing environment 110 and the electromechanical system 171 in FIGS. 1 and 2, other environments and systems may perform the process illustrated in FIG. 3.

At reference numeral 302, the process includes the service interface 130 provisioning a communications service session with the electromechanical system 171. For example, the service interface 130 may generate a provision session service request message 302A and transport it to the control interface 220. The provision service request message 302A may include an identifier of a service for establishing a communications connection with and/or provisioning the electromechanical system 171. In turn, the session manager 222 may reply to the message 302A with a provision service reply message 302B to establish a communications connection. The provision service reply message 302B may include a unique identifier of the electromechanical system 171, an indicator of whether the electromechanical system 171 has been provisioned, and protocol version information of the control interface 220, for example.

At reference numeral 304, the process includes the service interface 130 verifying one or both of a functionality profile and version of the system control logic 210. The process may also include verifying one or both of a functionality profile and a version of the electromechanical system 171. To achieve the verification, the service interface 130 generates a verify session service request message 304A and transports it to the control interface 220. The message 304A may specify a service to verify a functionality profile and/or version of the system control logic 210 and/or the electromechanical system 171. In reply to the verify session service request message 304A, the message generator 224 generates a verify service reply message 304B including the functionality profile and/or version information as part of its data payload.

The information gathered through the exchange of the messages 302A, 302B, 304A, and 304B can be stored in the service interface data store 120 and referenced when generating additional service requests. For example, the unique identifier for the communications session with the electromechanical system 171 generated and established at reference numeral 302 can be inserted in the session identifier fields in later messages (e.g., messages 306A, 310A, 316A, etc.) exchanged between the service interface 130 and the control interface 220.

At reference numeral 306, the process includes generating a service request message 306A to request a service from the electromechanical system 171. For example, based on instructions and any control parameters or other payload data provided by the management control system 140 to the service interface 130, the request message generator 136 generates the service request message 306A. The service interface 130 then transports it to the control interface 220 over the network 150. As noted above, the service request message 306A may be a standard or particular service request message depending upon the type of service request indicated in its service identifier field. The request message generator 136 may generate the service request message 306A with reference to the equipment index 122, standard services library 124, and/or the particular services library 126, as necessary, to identify the syntax, field codes, and various data values for messages.

As noted above, examples of standard service request messages include messages directed to power on/off, session, state, alarm, performance, or configuration management services, among others, supported by the electromechanical system 171. Examples of particular service request messages include requests for services supported only by particular systems, such as divert, pick, put, sort, print, scan, or label application services, among others. A request of any of these services may be sent by the management control system 140 to the electromechanical system 171 using the service request message 306A.

At reference numeral 308, the process includes the control interface 220 receiving the service request message 306A. In turn, the control interface 220 parses the service request message 306A to identify the requested service. The control interface further communicates with the system control logic 210 via the programming interface 226 to direct the electromechanical system 171 to perform the service requested in the service request message 306A. Thus, the control interface 220 provides an abstraction layer between the computing environment 110 and the system control logic 210 of the electromechanical system 171.

After it parses the service request message 306A to identify the requested service, the control interface 220 converts the message into an applications programming interface (API) request. The API request is then communicated to the system control logic 210 through the programming interface 226. The API request includes all the parameters necessary for the system control logic 210 to direct the devices A-D 230-233 to perform the service as requested in the service request message 306A. To the extent that the service request message 306A includes any timing conditions, control parameters, or other instructions specific to the service being requested, those parameters are passed from the control interface 220 to the system control logic 210 in the API request. It is noted that, in various embodiments, the parameters can be passed from the control interface 220 to the system control logic 210 using other (or additional) applications interfacing protocols and/or routines besides using API requests, calls, callback requests, etc. In some cases, for example, API callback requests may be used to establish event driven communications.

After it receives the parameters from the service request message 306A through the programming interface 226, the system control logic 210 controls and coordinates the operation of the electromechanical system 171. For example, the system control logic 210 controls one or more of the devices A-D 230-233 to perform the requested service according to the parameters. In that context, the system control logic 210 is designed to recognize the structure, format, and parameters within API requests received from the control interface 220. After such requests are received, the system control logic 210 is configured to interpret the parameters associated with service requests and direct the operations of the electromechanical system 171 accordingly.

Based on the operating status of the electromechanical system 171 during any given service being requested, associated events or alarms may occur at the electromechanical system 171. At such point, the system control logic 210 gathers any data associated with the events or alarms, formats that data according to the structure and/or format expected in a reply to the original API request from the control interface 220, and returns it to the control interface 220 through the programming interface 226.

Once such event or alarm data is received back at the control interface 220, the process includes the message generator 224 generating a service reply message 310A at reference numeral 310. The service reply message 310A may include an identifier that the service requested in the service request message 306A is ongoing or complete, for example, based on the event or alarm data. In other cases, the service reply message 310A may include an identifier of an ongoing operating mode or other specific status of the electromechanical system 171.

At reference numeral 312, the process includes the service interface 130 receiving the service reply message 310A. Further, at reference numeral 314, the process includes the message handler 138 parsing the service reply message 310A. Depending upon the content in the service reply message 310A, the message handler 138 may forward relevant mode, status, event, or other data from the message 310A to the management control system 140, as feedback from the electromechanical system 171. Thus, the management control system 140 can receive information from the electromechanical system 171 as it performs requested services in an ongoing and event-driven manner. The generation of the service request message 306A at reference numeral 306, the receipt of the service request message 306A at reference numeral 308, the generation of the service reply message 310A at reference numeral 310, and the receipt of the service reply message 310A at reference numeral 312 are collectively representative of a service 350 associated with one service ID.

At reference numeral 316, the process 300 includes the message generator 224 of the control interface 220 generating a service event message 316A. The service event message 316A may be generated when the system control logic 210 identifies certain conditions (e.g., event-driven conditions) that occur at the electromechanical system 171, such as completing, halting, or aborting services, for example. When such conductions occur, the system control logic 210 gathers any data associated with the conditions, formats it according to a structure and/or format expected in reply to an API callback request, for example, from the control interface 220, and returns it to the control interface 220 through the programming interface 226. In turn, the service event message 316A is generated by the message generator 224 according to the data received.

As other examples of event-driven conditions that may prompt the generation of the service event message 316A, in the case of an individual being directed to put an item in a location, the service event message 316A may be generated in response to the individual pressing a button after the item is placed. As still other examples, the service event message 316A may be generated in response to an alarm state or other triggering condition. After it is generated by the message generator 224, the service event message 316A is transported by the control interface 220 to the service interface 130 over the network 150.

At reference numeral 318, the process includes the service interface 130 receiving the service event message 316A. The generation of the service event message 316A at reference numeral 316 and the receipt of the service request message 316A at reference numeral 318 are collectively representative of a service 352 associated with one service ID.

At reference numeral 320, the process includes the message handler 138 parsing the service event message 316A. Depending upon the content in the service event message 316A, the message handler 138 may forward relevant mode, status, event, or other data from the message 316A to the management control system 140. Thus, the management control system 140 receives event-driven information from the electromechanical system 171 over time.

It is noted that the generation and communication of service request, reply, and event messages may be performed in sequences other than those shown in FIG. 3. Additionally, while the service interface 130 communicates service messages with the control interface 220 of the electromechanical system 171, the service interface 130 can concurrently interleave the transport of similar messages with other systems. For example, as shown in FIG. 3, the service interface 130 also communicates various service messages, such as the service messages 330 and 332, with the control interface 310 of the electromechanical system 181 (and with control interfaces of the electromechanical systems 172, 173, 182, 183, and 191). Generally, the computing environment 110 can communicate messages with any number of electromechanical systems in any suitable sequence, as necessary, to control the operation of the systems.

Although service request messages sent to two systems, such as the electromechanical systems 171 and 181 in FIG. 2, may specify a request for the same service (e.g., because each includes the same service ID in the service identifier field), the electromechanical systems 171 and 181 may support that same service using different control system logic and/or different hardware. However, from the standpoint of the management control system 140, the differences are inconsequential and masked by the service interface 130 and the control interface 220. Thus, the management control system 140 can view the electromechanical systems 171-173, 181-183, and 191 as service providers of a core set of standard and particular services, regardless of the types, makes, models, and vendors of the systems. The differences can be masked because the control interface 220 provides an abstraction layer between the computing environment 110 and the system control logic 210 of the electromechanical system 171. At the same time, the system control logic 210 (and the system control logic of the other electromechanical systems 172, 173, 181-183, and 191) is designed to conform to the inputs and outputs of the abstraction layer provided by the control interface 220. For example, the system control logic 210 is designed to recognize the structure, format, and parameters within API requests received from the control interface 220 and to reply in the accepted standard formats.

Figure 4:
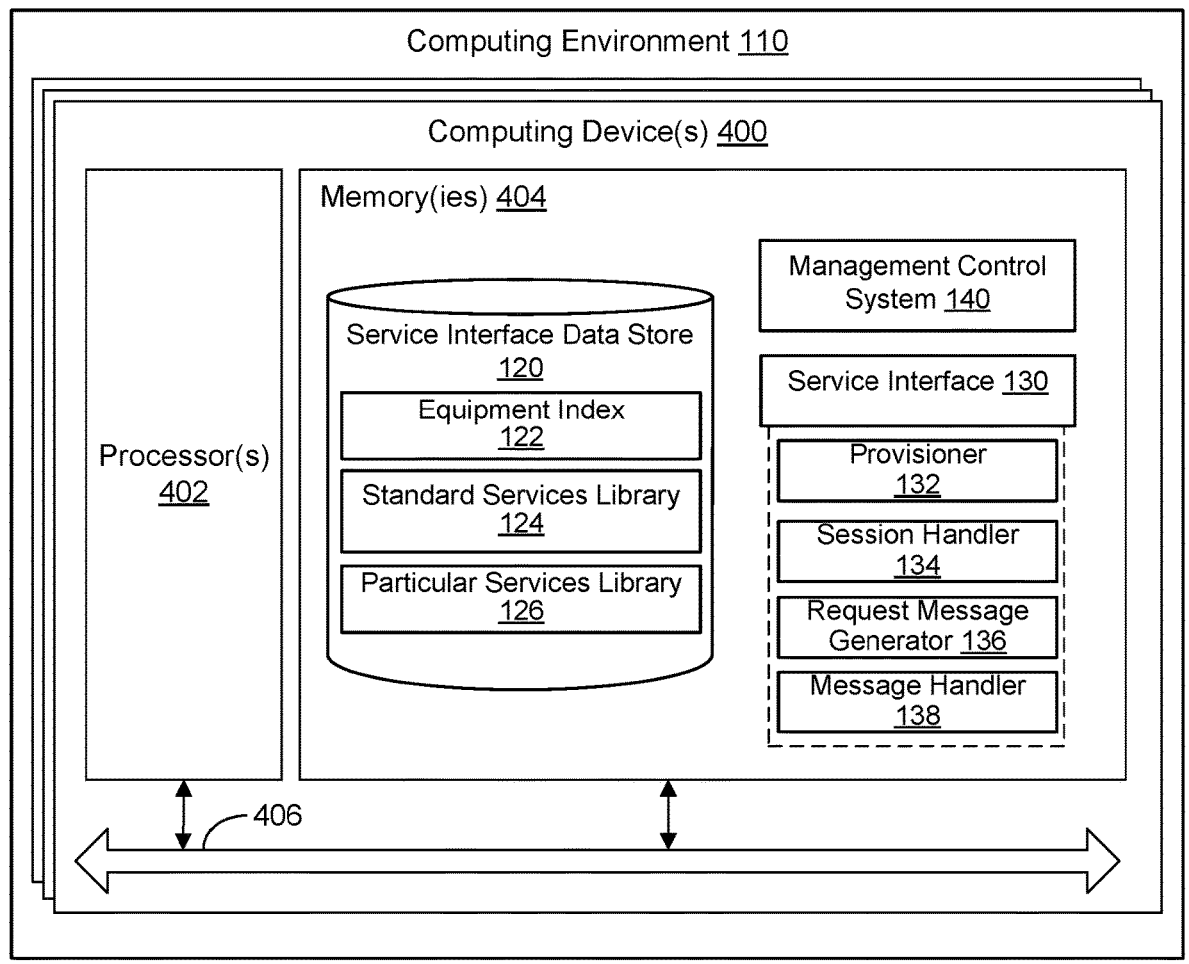
FIG. 4 illustrates an example schematic block diagram of a computing environment employed in the networked environment shown in FIG. 1 according to various embodiments of the present disclosure.

FIG. 4 illustrates an example schematic block diagram of the computing environment 110 employed in the networked environment 100 of FIGS. 1 and 2 according to various embodiments of the present disclosure. The computing environment 110 includes one or more computing devices 400. Each computing device 400 includes at least one processing system, for example, having a processor 402 and a memory 404, both of which are electrically and communicatively coupled to a local interface 406. To this end, each computing device 400 may be embodied as, for example, at least one server computer or similar device. The local interface 406 may be embodied as, for example, a data bus with an accompanying address/control bus or other bus structure as can be appreciated.

In various embodiments, the memory 404 stores data and software or executable-code components executable by the processor 402. For example, the memory 404 may store executable-code components associated with the service interface 130 for execution by the processor 402. The memory 404 may also store data such as that stored in the service interface data store 120, among other data.

It should be understood and appreciated that the memory 404 may store other executable-code components for execution by the processor 402. For example, an operating system may be stored in the memory 404 for execution by the processor 402. Where any component discussed herein is implemented in the form of software, any one of a number of programming languages may be employed such as, for example, C, C++, C #, Objective C, JAVA®, JAVASCRIPT®, Perl, PHP, VISUAL BASIC®, PYTHON®, RUBY, FLASH®, or other programming languages.

As discussed above, in various embodiments, the memory 404 stores software for execution by the processor 402. In this respect, the terms "executable" or "for execution" refer to software forms that can ultimately be run or executed by the processor 402, whether in source, object, machine, or other form. Examples of executable programs include, for example, a compiled program that can be translated into a machine code format and loaded into a random access portion of the memory 404 and executed by the processor 402, source code that can be expressed in an object code format and loaded into a random access portion of the memory 404 and executed by the processor 402, or source code that can be interpreted by another executable program to generate instructions in a random access portion of the memory 404 and executed by the processor 402, etc. An executable program may be stored in any portion or component of the memory 404 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 404 may include both volatile and nonvolatile memory and data storage components. Volatile components are those that do not retain data values upon loss of power. Nonvolatile components are those that retain data upon a loss of power. Thus, the memory 404 may include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may include, for example, a static random access memory (SRAM), dynamic random access memory (DRAM), or magnetic random access memory (MRAM), and/or other similar memory device. The ROM may include, for example, a programmable read-only memory (PROM), erasable programmable read-only memory (EPROM), electrically erasable programmable read-only memory (EEPROM), or other similar memory device.

Also, the processor 402 may represent multiple processors 402 and/or multiple processor cores and the memory 404 may represent multiple memories that operate in parallel, respectively, or in combination. Thus, the local interface 406 may be an appropriate network or bus that facilitates communication between any two of the multiple processors 402, between any processor 402 and any of the memories 404, or between any two of the memories 404, etc. The local interface 406 may include additional systems designed to coordinate this communication, including, for example, a load balancer that performs load balancing. The processor 402 may be of electrical or of some other available construction.

As discussed above, the service interface 130 and/or the management control system 140 may be embodied, in part, by software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart or process diagram of FIG. 3 is representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 402. The machine code may be converted from the source code, etc. Further, each block may represent, or be connected with, a circuit or a number of interconnected circuits to implement a certain logical function or process step.

Although the flowchart or process diagram of FIG. 3 illustrates a specific order, it is understood that the order may differ from that which is depicted. For example, an order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the service interface 130 and/or the management control system 140 that are embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system may be directed by execution of the instructions to perform certain processes such as those illustrated in FIG. 3. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may include a RAM including, for example, an SRAM, DRAM, or MRAM. In addition, the computer-readable medium may include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method, comprising:
   provisioning, by at least one computing device, a service session over a network with an electromechanical system among a plurality of electromechanical systems;
   verifying, by the at least one computing device, a functionality profile of a control system of the electromechanical system through the service session;
   generating, by the at least one computing device, a standard service request message to request a standard service from the electromechanical system, the standard service being supported by the plurality of electromechanical systems;
   generating, by the at least one computing device, a particular service request message to request a particular service from the electromechanical system based on the functionality profile of the electromechanical system, the particular service being supported by at least the control system of the electromechanical system; and
   forwarding, by the at least one computing device, the standard service request message and the particular service request message to the control system of the electromechanical system.

2. The method of claim 1, further comprising:
   based in part on performance of at least one of the standard service or the particular service at the electromechanical system, receiving, by the at least one computing device, a reply message from the control system of the electromechanical system.

3. The method of claim 1, wherein the verifying further comprises verifying, by the at least one computing device, a service interface version of individual ones of the plurality of electromechanical systems.

4. The method of claim 1, wherein generating the particular service request message further comprises referencing, by the at least one computing device, a services library for the electromechanical system based on the functionality profile of the control system of the electromechanical system.

5. The method of claim 1, further comprising:
   generating, by the at least one computing device, the standard service request message to request the standard service from a second electromechanical system, the second electromechanical system having a second control system different from the control system of the electromechanical system;
   forwarding, by the at least one computing device, the standard service request message to the second control system of the second electromechanical system, the second electromechanical system being configured to perform the standard service in response to the standard service request message using the second control system; and
   based in part on performance of the standard service at the second electromechanical system, receiving, by the at least one computing device, a second reply message from the second control system of the second electromechanical system.

6. The method of claim 5, wherein:
   the standard service request message includes a standard service identifier associated with the standard service; and
   the electromechanical system and the second electromechanical system perform the standard service using different system control and system hardware platforms.

7. The method of claim 1, wherein:
   the standard service comprises at least one of: a state, alarm, performance, or configuration service supported by each respective control system of the plurality of electromechanical systems; and
   the particular service comprises at least one of: a divert, pick, put, sort, print, scan, or label application service supported by at least the electromechanical system and unsupported by at least one other electromechanical system among the plurality of electromechanical systems.

8. The method of claim 1, further comprising parsing, by the control system of the electromechanical system, the standard service request message to direct the control system through an applications programming interface.

9. The method of claim 1, further comprising:
   in response to an event at the electromechanical system, receiving, by the at least one computing device, an event message from the control system of the electromechanical system; and parsing and directing, by the at least one computing device, the event message to a management control system.

10. A system, comprising:
at least one memory device to store a library of services supported by a plurality of electromechanical systems and computer-readable instructions; and
at least one computing device coupled to the at least one memory device and configured, through execution of the computer-readable instructions, to:
receive an event message over a network from a control system of an electromechanical system among a plurality of electromechanical systems;
in response to the event message, verify a functionality profile of the control system of the electromechanical system through a service session over the network, wherein the plurality of electromechanical systems comprise at least one other electromechanical system having at least one other control system different than the electromechanical system;
generate a service request message to request a service from the electromechanical system based on the functionality profile, the service being supported by the plurality of electromechanical systems;
forward the service request message to the control system of the electromechanical system; and
based in part on performance of the service at the electromechanical system, receive a reply message from the control system of the electromechanical system.

11. The system of claim 10, wherein the service request message is generated with reference to the library of services and the functionality profile of the control system of the electromechanical system.

12. The system of claim 10, wherein the service comprises at least one of: a standard service supported by each of the plurality of electromechanical systems or a particular service supported by at least the electromechanical system.

13. The system of claim 12, wherein:
the standard service comprises at least one of: a state, alarm, performance, or configuration service supported by each respective control system of the plurality of electromechanical systems; and
the particular service comprises at least one of: a divert, pick, put, sort, print, scan, or label application service supported by at least the electromechanical system and unsupported by the at least one other electromechanical system.

14. The system of claim 10, wherein the service request message comprises a header, a service identifier, and a payload comprising at least one instruction parameter.

15. The system of claim 10, wherein the at least one computing device is further configured to:
generate a second service request message to request the service from a second electromechanical system having a second control system that is different from the control system of the electromechanical system; and
forward the second service request message to the second control system of the second electromechanical system, the second electromechanical system being configured to perform the service in response to the second service request message using the second control system; and
based in part on performance of the service at the second electromechanical system, receiving, by the at least one computing device, a second reply message from the second control system of the second electromechanical system.

16. The system of claim 15, wherein:
the service request message includes a service identifier associated with the service;
the second service request message includes the service identifier associated with the service; and
the electromechanical system and the second electromechanical system each performs the service associated with the service identifier using different system control and system hardware platforms of respective control systems.

17. A method, comprising:
receiving, by at least one computing device, an event message over a network from a control system of an electromechanical system among a plurality of electromechanical systems;
in response to the event message, verifying, by the at least one computing device, a functionality profile of the control system of the electromechanical system through a service session over the network, wherein the plurality of electromechanical systems comprise at least one other electromechanical system having at least one other control system different than the electromechanical system;
generating, by the at least one computing device, a service request message to request a service from the electromechanical system based on the functionality profile, the service being supported by the plurality of electromechanical systems;
forwarding, by the at least one computing device, the service request message to the control system of the electromechanical system; and
based in part on performance of the service at the electromechanical system, receiving, by the at least one computing device, a reply message from the control system of the electromechanical system.

18. The method of claim 17, wherein the service request message is generated with reference to a library of services for the electromechanical system and the functionality profile of the control system of the electromechanical system.

19. The method of claim 17, wherein:
the service comprises at least one of: a standard service supported by each of the plurality of electromechanical systems or a particular service supported by at least the electromechanical system;
the standard service comprises at least one of: a state, alarm, performance, or configuration service supported by each respective control system of the plurality of electromechanical systems; and
the particular service comprises at least one of: a divert, pick, put, sort, print, scan, or label application service supported by at least the electromechanical system and unsupported by the at least one other electromechanical system.

20. The method of claim 17, further comprising:
generating, by the at least one computing device, the service request message to request the service from a second electromechanical system, the second electromechanical system having a second control system different from the control system of the electromechanical system;
forwarding, by the at least one computing device, the service request message to the second control system of the second electromechanical system, the second electromechanical system being configured to perform the service in response to the service request message using the second control system; and based in part on performance of the service at the second electromechanical system, receiving, by the at least one computing device, a second reply message from the second control system of the second electromechanical system.

\* \* \* \* \*